United States Patent
Duffy

(10) Patent No.: US 6,261,395 B1
(45) Date of Patent: Jul. 17, 2001

(54) MANUFACTURE OF STIFFENED COMPOSITE STRUCTURES

(75) Inventor: Roger P Duffy, Balderstone (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/401,413

(22) Filed: Sep. 22, 1999

Related U.S. Application Data

(63) Continuation of application No. PCT/GB99/01374, filed on May 4, 1999.

(30) Foreign Application Priority Data

May 15, 1998 (GB) .................................................. 9810528

(51) Int. Cl.⁷ .................................................. B32B 31/04
(52) U.S. Cl. ........................... 156/64; 156/154; 156/175; 156/285; 156/290; 156/297; 156/307.7; 353/28; 356/375
(58) Field of Search .............................. 156/64, 154, 173, 156/175, 272.8, 273.3, 275.3, 275.5, 275.7, 285, 290, 297, 307.7; 353/28, 121, 122; 356/375, 376

(56) References Cited

U.S. PATENT DOCUMENTS

| | | |
|---|---|---|
| 5,381,258 | 1/1995 | Bordignon et al. . |
| 5,624,088 | 4/1997 | Fiore . |
| 5,651,600 | 7/1997 | Dorsey-Palmateer . |
| 5,771,680 * | 6/1998 | Zahedi et al. ........................ 156/196 |

FOREIGN PATENT DOCUMENTS

WO 96/19335   6/1996   (WO) .

* cited by examiner

*Primary Examiner*—Michael W. Ball
*Assistant Examiner*—Michael A. Tolin
(74) *Attorney, Agent, or Firm*—Nixon & Vanderhye P.C.

(57) ABSTRACT

A method of manufacturing a stiffened composite structure comprising the steps of: forming the structure around a mandrel tool; using digital camera data to record the positions of desired pad locations on the structure; bonding pads to the structure at the desired locations; curing the pads and structure; forming stiffeners from composite materials including forming a plurality of tabs at points on the stiffener corresponding to the pads on the structure; using a laser theodolite connected to receive the stored information of the pad locations relative to a datum point on the stiffener to locate the stiffener tabs accurately on the pads; and bonding the stiffeners to the structure via the tabs and pads. Preferably, the location tabs and pads are machined off the final stiffened structure after autoclaving.

11 Claims, 4 Drawing Sheets on a cured structure and not an uncured duct as in Example 1.

MANUFACTURE OF STIFFENED COMPOSITE STRUCTURES

This appln is a con of PCT/GB99/01374 May 4, 1999.

BACKGROUND OF THE INVENTION

1. Field of the Invention

The present invention relates to methods of and apparatus for manufacturing stiffened structures made from composite materials such as carbon fibre composites.

2. Discussion of Prior Art

In many areas of manufacturing lightweight, strong, structures are made from composite materials which are easy to form into complex three dimensional shapes. Automobile bodies and aircraft structures such as wings and intake ducts are commonly made from these materials. Often such structures are large and require stiffeners to give them added strength and rigidity and sometimes to provide attachment points to other structures.

Conventionally stiffened composite structures are made by forming the basic structure from uncured composite material using a mould tool whilst constructing the composite stiffeners separately also from uncured composite material. The separate stiffeners and moulded structure are then autoclaved to cure them and a difficult process then follows whereby the stiffeners are attached to the moulded structure. Typically the moulded structure will be held on a jig and a complex scaffolding erected around it. Extensive drilling of the structure and the stiffeners is then required and the two parts brought together for bolt and/or pin attachment. Where precise positioning of the stiffeners on the structure is required, say because the stiffened structure is to interface with another structure, this can be a very difficult procedure indeed and it can be extremely difficult to achieve the accuracy of drilling and location required because of the intrinsically variable nature of the jigs and scaffolding used.

SUMMARY OF THE INVENTION

It is an object of our invention to provide a method of producing a stiffened composite structure which is simpler and more accurate than the known methods.

According to the present invention in one aspect thereof there is provided a method of manufacturing a stiffened composite structure comprising at least the steps of:

moulding the structure around a mandrel tool;

curing the structure;

forming stiffeners from composite material including forming a plurality of tabs on the stiffener;

using a laser theodolite to locate the tabs accurately on the structure; and, bonding the stiffeners to the structure at least via the tabs.

According to the present invention in another aspect thereof there is provided a method of manufacturing a stiffened composite structure comprising at least the steps of:

moulding the structure around a mandrel tool;

using a laser or digital camera to record the positions of desired pad locations on the structure;

bonding pads to the structure at the desired locations;

curing the pads and structure;

forming stiffeners from composite material including forming a plurality of tabs at points on the stiffener corresponding to the pads on the structure;

using a laser theodolite connected to receive the stored information of the pad locations relative to a datum point on the structure to locate the tabs accurately on the pads; and, bonding the stiffeners to the structure at least via the tabs and pads.

It will be appreciated that bonding avoids penetrating the structure by e.g. drilling to provide bolt locations. This has advantages in terms of strength, durability, and aerodynamically clean surfaces.

Any bonding or curing steps may be achieved using an elevated temperature process, for example an autoclave may be used. Alternatively, any bonding or curing steps may be achieved using a cold processing technique. The cold processing technique may utilise electromagnetic radiation such as microwave energy, ultra-violet radiation, or may utilise electron beams, for example.

The stiffeners may be bonded to a convex surface of the structure. The stiffeners may alternatively or additionally be bonded to a concave surface of the structure.

The tabs may advantageously be left over from an injection moulding process.

Preferably the location tabs and any pads are machined off the final stiffened structure after bonding.

BRIEF DESCRIPTION OF THE DRAWINGS

The invention will now be described by way of example only and with reference to the accompanying drawings of which FIGS. 1 to 4 show a method of manufacturing a stiffened composite aircraft air intake duct.

FIG. 1 is a perspective view showing the location of a stiffener on a duct in accordance with the present invention;

FIG. 3 is a perspective view illustrating the clean up machining of the slot in a slot type stiffener; and FIG. 4 is a perspective view illustrating the tab removal from a stiffener after bonding to the surface of a duct.

DETAILED DESCRIPTION OF PREFERRED EMBODIMENTS

A method of manufacture of an aircraft duct is carried out in four stages which are described below including two variations of the first stage.

Figure 1:
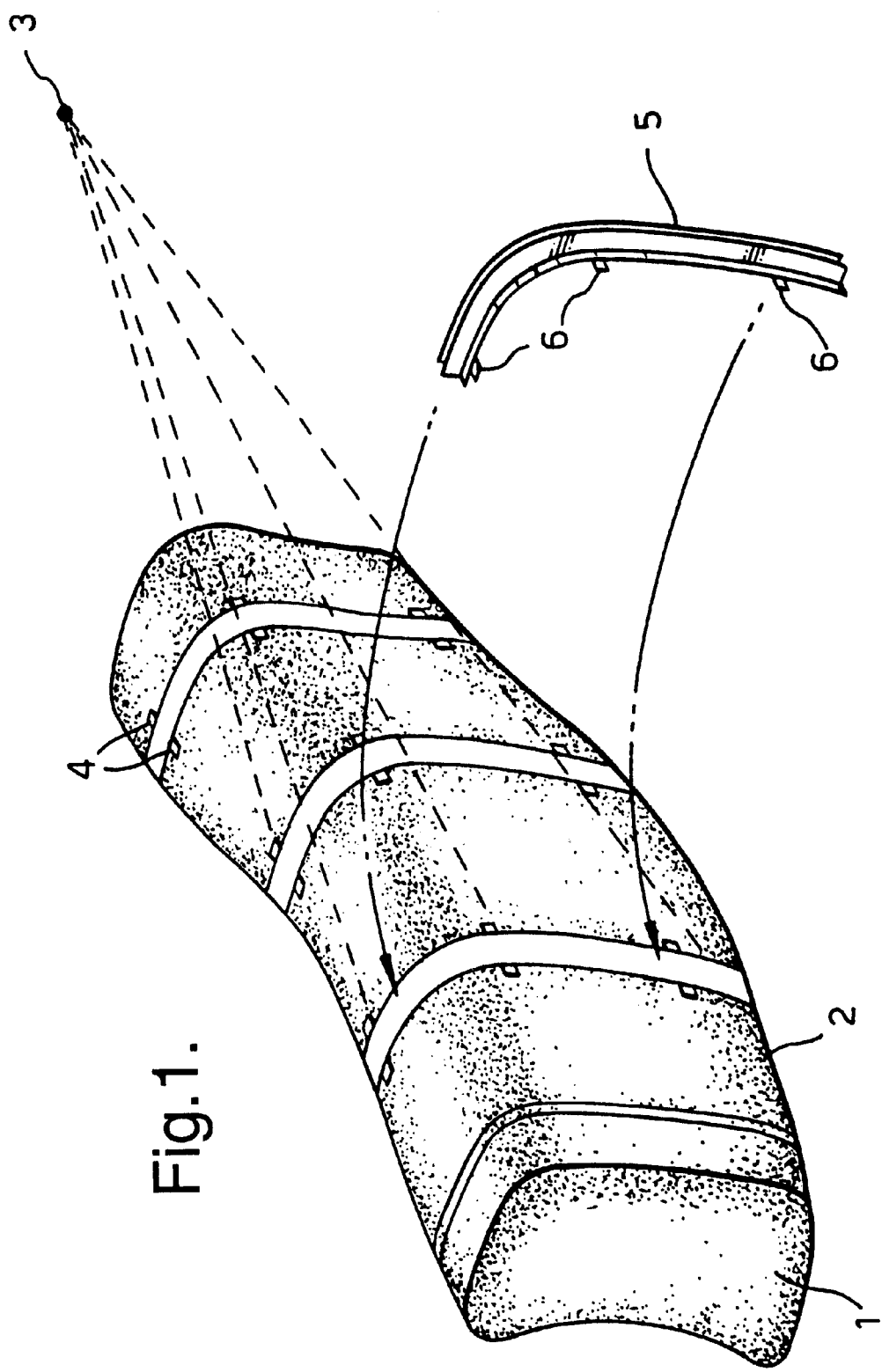
Figure 2A:
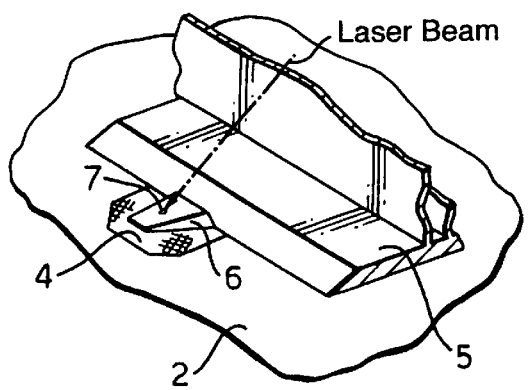
FIGS. 2a through 2e are different arrangements for bonding the stiffener to the duct of FIG. 1.
Figure 2B:
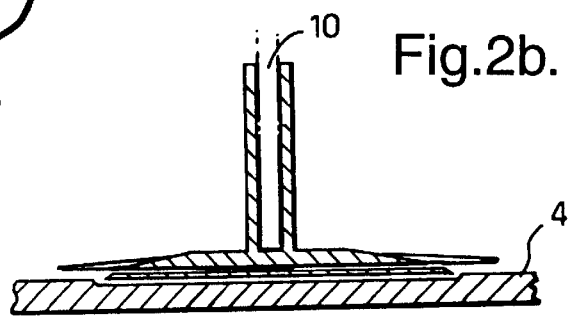
Figure 2C:
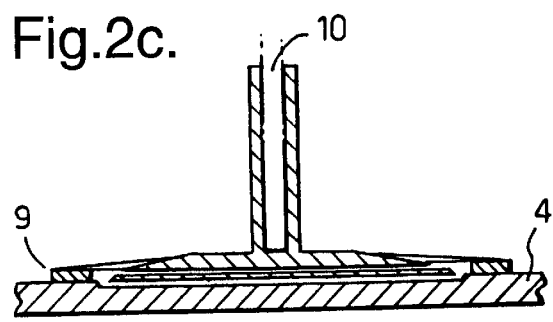
Figure 2E:
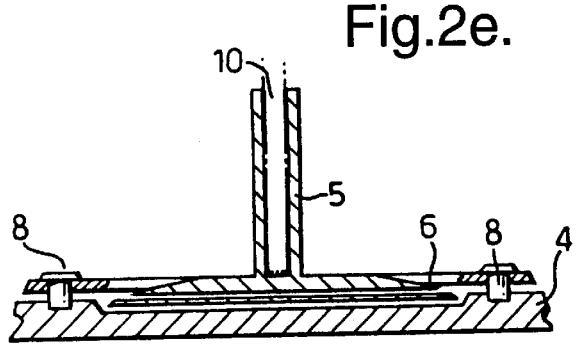
Figure 2D:
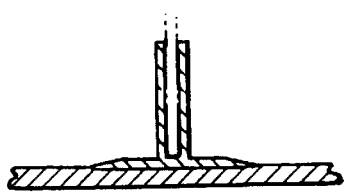

First Stage: Duct Manufacture (Example 1) (see FIG. 1)

Step 1. Using collapsible mandrel tooling, fibreplace (a winding type process) the duct 2 around the mandrel 1.

Step 2. Using a 'Virtek' laser projection type camera 3 (accuracy ±0.20 mm) identify and store pad location positions 4 around and along the duct 2 which is uncured at this stage. Position uncured sacrificial fibreglass pads 4 on the duct 2 at the desired locations. The pads could be between 0,25 mm to 3,0 mm thick depending on bonding/fastening method chosen for the attachment of the stiffeners.

Step 3. Bag and cure the pads 4 and duct 2 and bond the pads to the duct in one final operation.

First Stage: Duct Manufacture (Example 2) (see FIG. 1)

This is a similar method to that described in Example 1 above but the pads 4 are bonded to the duct wall 2 in a separate bonding operation after curing the duct itself i.e. the pads are co-bonded, uncured pads, cured and bonded to the pre-cured duct in same operation. The bonding operation may then be carried out at lower temperatures in the range 80° C.–120° C.

Second Stage: Stiffener Manufacture (see FIG. 1)

A stiffener 5 is a support structure that runs circumferentially on the duct. A series of such stiffeners 5 is provided longitudinally on the duct. The stiffeners are made separately by a resin injection/match moulded process (RTM process). RTM of the stiffeners is carried out by using an injection or bleed point around the preform/mould used to make the stiffener and "modifying it" to produce a plurality of tabs 6. These tabs may be used as sacrificial tooling locations.

Third Stage: Location of Stiffener to Duct (see FIGS. 2a to 2e)

Using "Smart", an accurate laser theodolite (not shown), typically accurate to ±0.002", the stiffeners 5 are next positioned accurately on the duct 2 using the stored tab position data and referencing of a moulded marker, peg, hole or indentation 7 of some kind.

Having positioned the stiffener 5 it is next locally bonded to the duct 2 via the tabs 6 and the pads 4 located on the duct wall. The tabs 6 may be bonded with iso-cyanate or a U.V. curing acrylic 9 (see FIG. 2c). Both are cold processes and almost instantaneous. Alternatively shallow pins 8 (typically plastic) or a combination of pins and bond may be used (see FIG. 2e). It may be desirable to pin the centre tab 6 to the mould location/datum and bond others. The bonding option also greatly assists in holding things in place whilst the duct is rotated to work on other areas.

With film adhesive in the bondline between stiffeners and duct one of the critical features is that their position must be maintained, but at the same time allow some vertical consolidation and conformity. The flexible tabs 6 allow this. The fully pinned up version shown in FIG. 2e, will allow such consolidation and conformity, if pinned via the core mandrel tooling, with holes through the duct. This can result in some degree of "lock-on" thus risking poor bond control and difficulty in strip-down.

Fourth Stage: Bonding of Stiffeners to Duct (see FIGS. 3 and 4)

If the stiffeners are of the slotted type (10 indicates the slots in FIG. 2e) the method is to fit a filler block, to maintain the stiffener's shape, and angle blocks around the outside. Next, the stiffened duct assembly is bagged up for a conventional autoclave bonding operation.

Following autoclaving the next steps are:

(i) Strip-down external tooling after cure.

Figure 3:
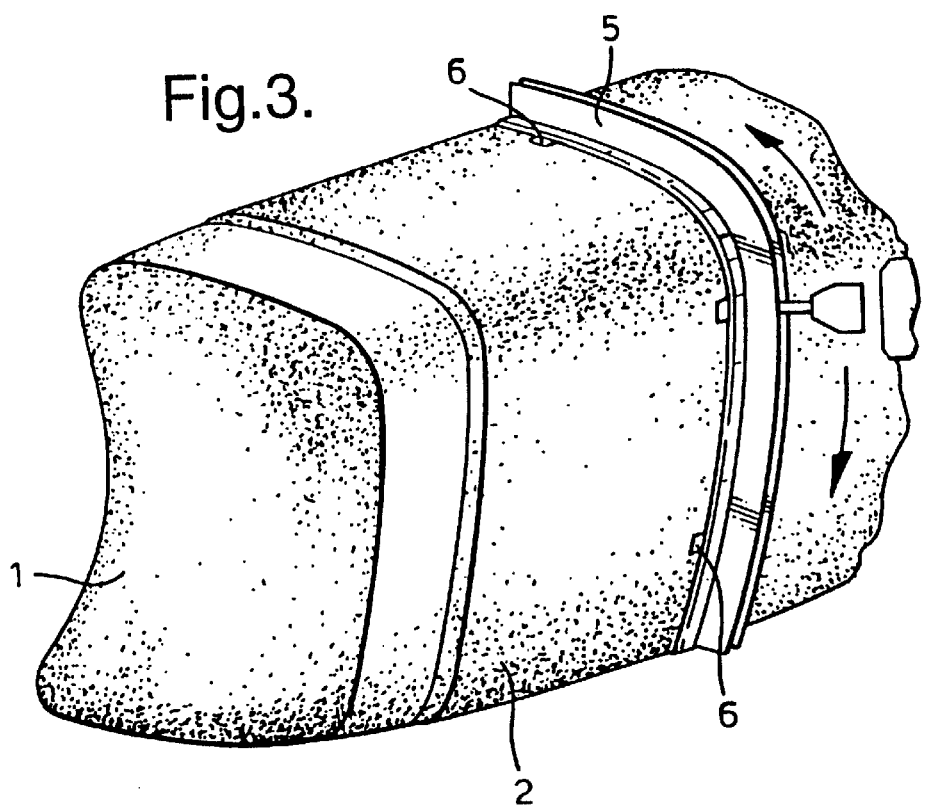
Figure 4:
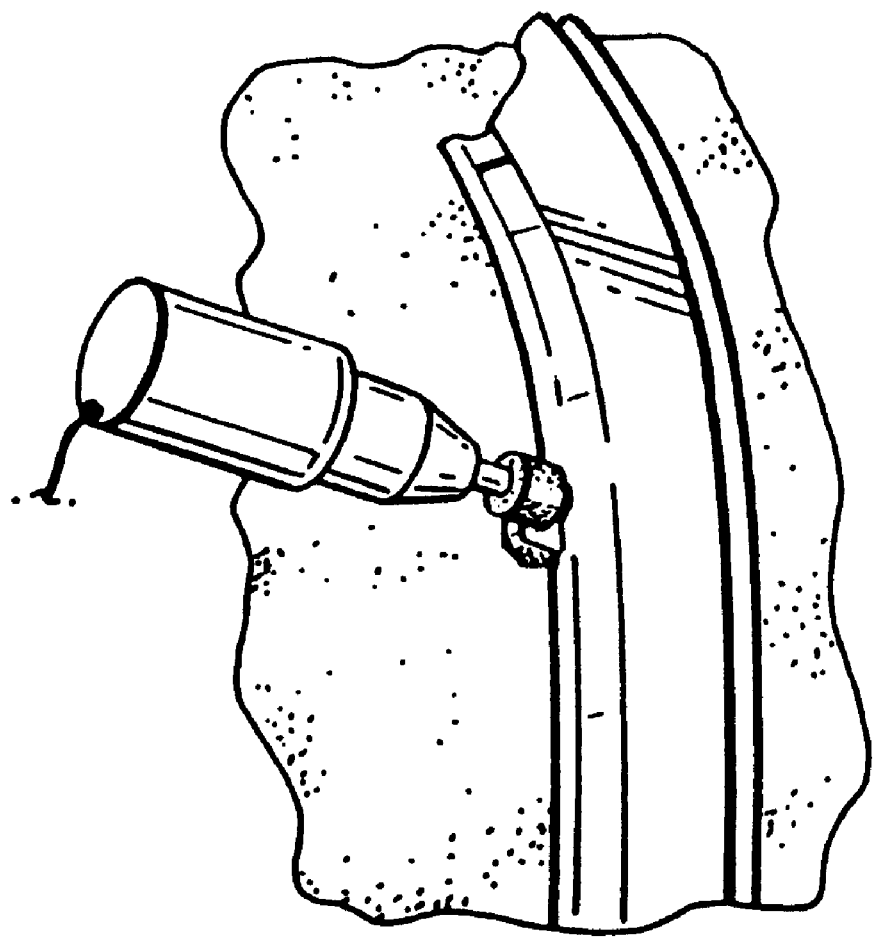

(ii) Mount core mandrel and duct on a machine tool, establish datum and, again using the stored location data, carry out a clean up operation with the cutter, machining off relatively thin sacrificial material from the slot (or face of a blade-type stiffener) (see FIGS. 3 and 4).

(iii) If necessary after machining grind off the location tabs and pads by hand or with the machine.

Advantage of the Manufacturing Method Described Above no need to penetrate the duct wall or fill with fasteners etc.

no risk of leakage if the duct is to form part of the fuel tank boundary in the final aircraft tight control "potentially" of tolerances that effect other substructure members, frames, shear webs etc.

as locations are moulded in, there are fewer operations and potential for error or tolerance build less risk of deformation or movement during cure or lock-on situations arising.

Alternative tooling routes would require either extensive drilling of the duct or some form of complex scaffolding type tooling around the duct. This has to be controlled and bagged around all at higher cost and risk.

Many variations and modifications of the above process will now suggest themselves to ones skilled in the art. For example, the bonding or curing steps could be achieved by either an elevated temperature technique, such as autoclaving, or a cold processing technique such as the use of electromagnetic radiation, in particular microwave, ultraviolet or electron beam radiation.

What is claimed is:

1. A method of manufacturing a stiffened composite structure comprising at least the steps of:
    moulding the structure around a mandrel tool;
    curing the structure;
    forming stiffeners from composite material including forming a plurality of tabs on the stiffener;
    using a laser theodolite to locate the stiffener tabs accurately on the structure; and,
    bonding the stiffeners to the structure at least via the tabs.

2. A method as claimed in claim 1 wherein the bonding or curing steps are achieved by the use of an autoclave.

3. A method as claimed in claim 1 wherein the bonding or curing steps are achieved by the use of a cold processing technique.

4. A method as claimed in claim 3 wherein the cold processing technique utilises electromagnetic radiation.

5. A method as claimed in claim 3 wherein the cold processing technique utilises electron beams.

6. A method as claimed in claim 1 wherein the stiffeners are bonded to a convex surface of the structure.

7. A method as claimed in claim 1 wherein the stiffeners are bonded to a concave surface of the structure.

8. A method as claimed in claim 1 wherein the tabs are left over from an injection moulding process.

9. A method as claimed in claim 1 wherein the tabs are machined off the final stiffened structure after bonding.

10. A method of manufacturing a stiffened composite structure comprising at least the steps of:
    moulding the structure around a mandrel tool;
    using a laser or digital camera to record the positions of desired pad locations on the structure;
    bonding pads to the structure at the desired locations;
    curing the pads and structure;
    forming stiffeners from composite material including forming a plurality of tabs at points on the stiffener corresponding to the pads on the structure;
    using a laser theodolite connected to receive the stored information of the pad locations relative to a datum point on the structure to locate the stiffener tabs accurately on the pads; and,
    bonding the stiffeners to the structure at least via the tabs and pads.

11. A method as claimed in claim 10 wherein the pads and tabs are machined off the final stiffened structure after bonding.

* * * * *